(12) United States Patent
Hayashi et al.

(10) Patent No.: US 6,738,184 B2
(45) Date of Patent: May 18, 2004

(54) OPTICAL AMPLIFIER FOR AMPLIFYING MULTI-WAVELENGTH LIGHT

(75) Inventors: Etsuko Hayashi, Kawasaki (JP);
Yasushi Sugaya, Kawasaki (JP);
Yoshihito Onoda, Kawasaki (JP);
Keiko Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 87 days.

(21) Appl. No.: 09/949,873

(22) Filed: Sep. 12, 2001

(65) Prior Publication Data

US 2002/0101652 A1 Aug. 1, 2002

(30) Foreign Application Priority Data

Jan. 31, 2001 (JP) ........................................ 2001-023370

(51) Int. Cl.[7] ............................................... H04B 10/12
(52) U.S. Cl. .............................. 359/341.4; 359/341.41; 359/341.42; 359/341.43
(58) Field of Search .................... 359/341.4, 341.41, 359/341.42, 341.43, 337.11, 341.3, 161

(56) References Cited

U.S. PATENT DOCUMENTS

| | | | | |
|---|---|---|---|---|
| 5,703,711 A | * | 12/1997 | Hamada | ...................... 359/177 |
| 6,023,366 A | * | 2/2000 | Kinoshita | .................... 359/177 |
| 6,049,413 A | * | 4/2000 | Taylor et al. | ................ 359/161 |
| 6,233,092 B1 | * | 5/2001 | Flood et al. | ................. 359/134 |
| 6,288,834 B1 | * | 9/2001 | Sugaya et al. | ............ 359/341.1 |
| 6,342,966 B1 | * | 1/2002 | Button et al. | ................ 359/143 |
| 6,353,496 B1 | * | 3/2002 | Jung et al. | ................... 359/124 |
| 6,359,726 B1 | * | 3/2002 | Onaka et al. | ............ 359/337.1 |
| 6,404,540 B1 | * | 6/2002 | Hwang et al. | ........... 359/337.1 |
| 6,426,817 B1 | * | 7/2002 | Tomita | ........................ 359/127 |
| 2001/0012146 A1 | * | 8/2001 | Shiozaki et al. | ............. 359/337 |

FOREIGN PATENT DOCUMENTS

| | | |
|---|---|---|
| EP | 1 073 166 A2 * | 1/2001 |
| EP | 1 087 550 A1 * | 3/2001 |
| JP | A-09-321373 | 12/1997 |
| JP | A-2000-307552 | 11/2000 |

OTHER PUBLICATIONS

Adikan et al. "A Study of Gain and Noise Figure Performance of an L–Band Erbium–Doped Fibre Amplfiier (EDFA) with 980 nm and Amplified Spontaneous Emission (ASE) Pumps" TENCON 2000, Sep. 2000, pp. 417–420, vol. 3.*

Desurvire et al. "Dynamic Gain Compensation in Saturated Erbium–Doped Fiber Amplifiers." Photonics Tech. Lett. 3:5, May 1991, pp. 453–455.*

Buxens e tal. Gain Flattened L–Band EDFA based on upgraded C–Band EDFA using forward ASE pumping in an EDF Section Elect. Lett. 36:9, Apr. 2000, pp. 821–823.*

Srivastava et al. "Fast–Link Control Protection of Surviving Channels in Multiwavelength Optical Networks." Photonics Tech. Lett. 9:12, Dec. 1997, pp. 1667–1669.*

Majdi et al. "Long–Wavelength–Band Er3+–Doped Fiber Amplifier Incorporating a Ring–Laser as a Seed Signal Generator." Selected Tops. in Quantum Elect. 7:1, Jan./Feb. 2001, pp. 59–63.*

(List continued on next page.)

*Primary Examiner*—Thomas G. Black
*Assistant Examiner*—Stephen Cunningham
(74) *Attorney, Agent, or Firm*—Staas & Halsey LLP

(57) ABSTRACT

Optical signals (multi-wavelength light) are guided to an EDF. The EDF is supplied with pump light generated by a first and a second pump light sources. Dummy light is generated by a dummy light source and supplied to the EDF. The wavelength of the dummy light is shorter than a wavelength range in which the optical signals are allocated.

14 Claims, 18 Drawing Sheets

OTHER PUBLICATIONS

Yamashita et al. "L–Band Erbium–Doped Fiber Amplifier Incorporating an Inline Fiber Grating Laser." Selected Tops. in Quantum Elect. 7:1, Jan./Feb. 2001, pp. 44–48.*

Yoon et al. "Link–Control Gain Clamping for a Cascaded EDFAs Link Using Differential ASE Monitor." Photonics Tech. Lett. 12:10, Oct. 2000, pp. 1334–1337.*

Jackel et al. "All–Optical stabilization for cascaded multi–channel erbium–doped fiber amplifiers wtih changing numbers of channels." OFC 1997, Feb. 1997, pp. 84, 85.*

Xiao et al. "A Novel Compensating Light Injection Configuraiton for Gain–Clamped EDFA's." Photonics Tech. Lett. 12:7, Jul. 2000, pp. 789–791.*

Chinn, S.R. "Simplified Modeling for Transients in Gain–Clamped Erbium–Doped Fiber Amplifiers." J. Lightwave Tech. 16:6, Jun. 1998, pp. 1095–1100.*

Takahashi et al. "An Output Power Stabilized Erbium–Doped Fiber Amplifier with Automatic Gain Control." IEEE J. Selected Tops. in Quantum Elect. 3:4, Aug. 1997, pp. 1019–1026.*

Choi et al. "High–Gain Coefficient Long–Wavelength–Band Erbium–Doped Fiber Amplifiers Using 1530–nm Band Pump." Photonics Tech. Lett. 13:2, Feb. 2001, pp. 109–111.*

Hansen et al. "L–Band Erbium–Doped Fiber Amplfiers—Theory and Design." Published Jan. 31, 2000 (thesis for Master's Degree).*

American Heritage Dictonary, $3^{rd}$ ed. Houghton Mifflin Co. 1992.

* cited by examiner

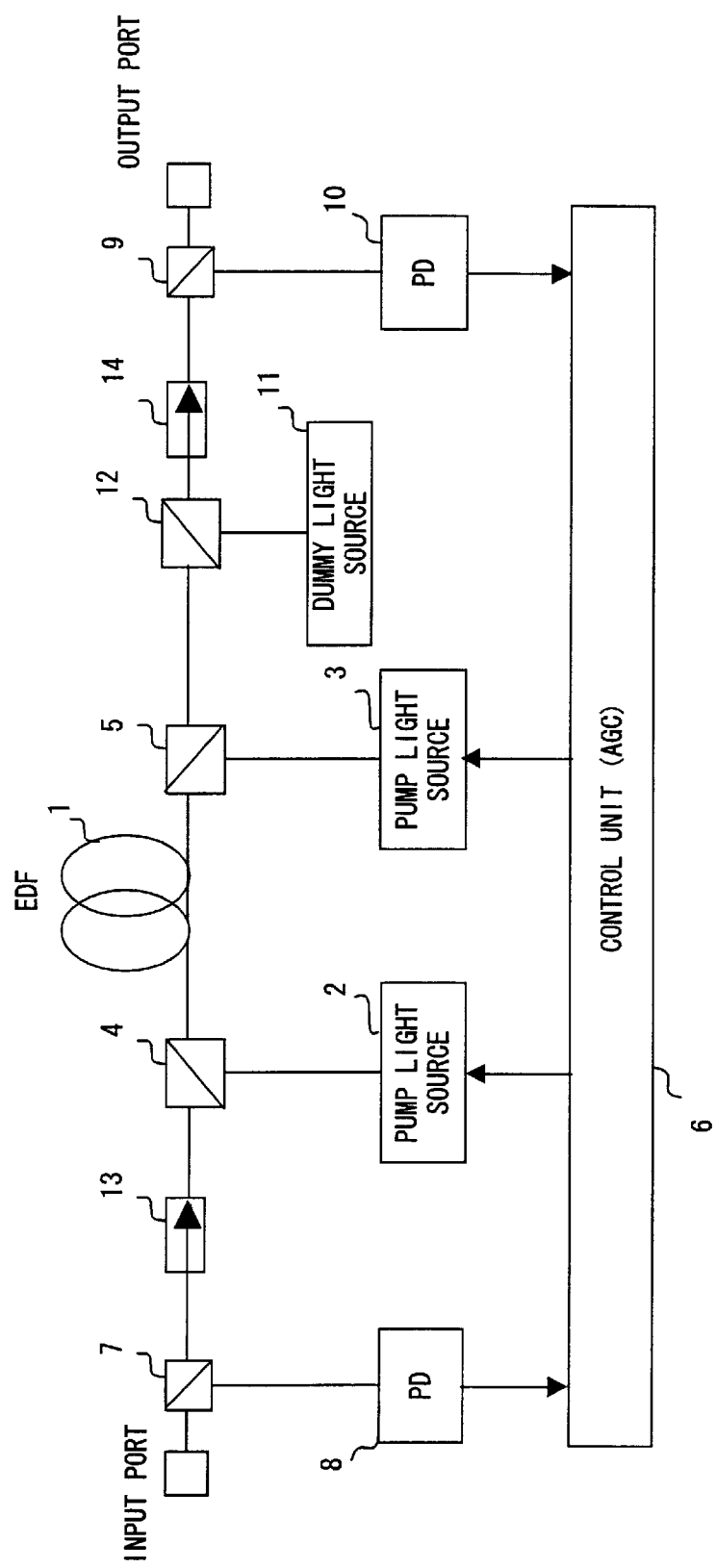
F I G. 1 2

F I G. 1 7

OPTICAL AMPLIFIER FOR AMPLIFYING MULTI-WAVELENGTH LIGHT

BACKGROUND OF THE INVENTION

1. Field of the Invention

This invention is concerned with an optical amplifier for use with a wavelength division multiplex optical communications system.

2. Description of the Related Art

In association with an optical communications system, it is well known that a long distance transmission of optical signals is achieved via use of optical amplifiers disposed along an optical transmission line at intervals of a certain distance. For example, a transmission line crossing the Pacific Ocean is provided with several tens to several hundreds of optical amplifiers along the way. Among various types of optical amplifiers developed and used for such a purpose, the most popular is the type that makes use of rare-earth element doped optical fibers (hereinafter called "rare-earth doped fiber optical amplifiers").

Expansion in the transmission capacity of communications systems is absolutely necessary to meet the rapid increase in the volume of information that is exchanged through communication networks such as the Internet. The Wavelength Division Multiplexing (WDM) transmission is one of the technologies being developed to realize such a large capacity of transmission systems, and has already been employed on a commercial scale.

In a WDM transmission system, a plurality of optical signals with different wavelengths are multiplexed and transmitted through a single optical fiber. Thus, a certain wavelength band is needed for the plurality of optical signals. In practice, for example, bands called a C-band (1530–1560 nm) and an L-band (1560–1620 nm) are known. Therefore, an optical amplifier for WDM system is required to collectively amplify all optical signals within the C-band and/or L-band. Among rare-earth doped optical fiber amplifiers, erbium doped optical fiber amplifiers are the most common ones used for amplifying optical signals within the C-band or L-band. For this reason, our discussion on optical amplifiers below is concerned with erbium doped fiber optical amplifiers.

FIG. 1 shows the performance of a conventional erbium doped fiber optical amplifier, in particular, the performance of it when multi-wavelength light is amplified. The length of an erbium doped fiber is shown on the horizontal axis, and the optical powers at points along the erbium doped fiber are shown on the vertical axis for the various wavelengths. In addition, optical power of each of the input signals in the multi-wavelength light is –20 dBm.

When multi-wavelength light is amplified by an erbium doped fiber optical amplifier, a deviation of the gain with respect to wavelength depends on the length of the erbium doped fiber. When the erbium doped fiber is short, the shorter the wavelength of an input light, the larger the gain becomes. In the example shown in FIG. 1, 88 optical signals with the optical power of –20 dBm/ch are input, and pump light with 980 nm is provided in a same direction as the signals. The optical power deviation exceeds 10 dB when the erbium doped fiber is about 10 meters. In contrast, when the erbium doped fiber is longer, the gain deviation becomes smaller, as the gains for shorter wavelength light tend to fall as the fiber becomes longer. In the case of the example shown in FIG. 1, when the erbium doped fiber length is 40 meters, the optical power deviation is reduced to around 5 dB.

FIG. 2 shows the average gain and the gain tilt of an erbium doped fiber optical amplifier. The average gain here means the average of gains measured respectively for a plurality of optical signals being amplified by an erbium doped fiber optical amplifier. The gain tilt means the difference between gains for the shortest wavelength (e.g., 1570 nm) and the longest wavelength (e.g., 1607 nm) among a plurality of optical signals that are amplified by an erbium doped fiber optical amplifier.

The average gain obtained by an erbium doped fiber optical amplifier, as shown in FIG. 2, stays fairly unchanged for erbium doped fiber lengths of 10 through 40 meters, while the gain tilt becomes the smallest when the erbium doped fiber length is about 40 meters. Here, the average gain should be large in order to obtain large output power of an erbium doped fiber amplifier. The gain tilt should be small in order to evenly amplify a plurality of optical signals with different wavelength. Based on the consideration of these factors, in an erbium doped fiber optical amplifier for amplifying L-band, it is preferable that length of the erbium doped fiber is 40 meters, under the conditions assumed here.

FIG. 3 shows the gain of an erbium doped fiber optical amplifier with respect to the inverted population. It is desirable that gain is constant (or flat) in a wavelength range corresponding to the L-band in order to evenly amplify all the optical signals within the L-band. Therefore, it is understood that the inverted population of an erbium doped fiber is best to be set at about "0.4" for amplifying L-band optical signals. However, the gain for a unit fiber length is small when the inverted population is about "0.4". Thus, the length of an erbium doped fiber needs to be relatively long in order to obtain a large gain with the erbium doped fiber.

In this way it is imperative that the length of an erbium doped fiber becomes long to some extent if an erbium doped fiber optical amplifier is used for amplifying optical signals of L-band.

In FIG. 1, it is shown that the optical power of an optical signal with shorter wavelength becomes the maximum when the length of an erbium doped fiber is about 10 meters, and the optical power gradually declines as the length increases. This phenomenon is explained as being caused by the energy of optical signals with the shorter wavelength (for example, optical signals of 1570–1580 nm) being absorbed by optical signals with the longer wavelength (for example, optical signals of 1600–1607 nm). In other words, the shorter wavelength optical signals are serving as pump light for the longer wavelength optical signals.

In a WDM transmission system, mutually different wavelengths are allocated to a plurality of transmission channels. Therefore, when a new transmission channel is added, new optical signal with a corresponding wavelength is added to a transmission line. On the other hand, when an existing transmission channel is removed, transmission of the corresponding wavelength is stopped.

As described above, the signal light with shorter wavelength works as pump light for the signal light with longer wavelength in the L-band. Therefore, if a transmission channel corresponding to a signal light with shorter wavelength is stopped, a phenomenon as if optical power of pump light became smaller for signal lights with longer wavelengths in the erbium doped fiber optical amplifier.

FIG. 4 shows an interaction between optical signals of mutually different wavelengths. Here, it is assumed that only signal lights with 1570 nm and 1584 nm are transmitted. Profile-a shows the optical power of the 1570 nm signal light, when transmitting both 1570 nm and 1584 nm signal lights. Profile-b shows the optical power of the 1584 nm signal light, when transmitting both 1570 nm and 1584 nm signal lights. Profile-c shows the optical power of the 1584 nm signal light, when transmitting only the 1584 nm signal light.

As is clearly understood from these profiles, the optical power of 1584 nm signal light varies markedly depending on the presence or absence of 1570 nm signal light. In particular, in a case that erbium doped fiber is 40 meters, the optical power of 1584 nm signal light is reduced by more than 5 dB, when the 1570 nm signal light is stopped.

When amplifying optical signals within the L-band using an erbium doped fiber optical amplifier, terminating an optical signal with the shorter wavelength results in reduction in the optical power of optical signal with longer wavelength. Then, if output power of the optical signal is small, the optical signal may not be detected by a receiver (receiving station or optical receiver in the receiving station).

As a solution to this problem, a configuration with a function for adjusting the optical powers of each wavelength (such as an automatic gain controller: AGC) is considered. According to this configuration, the power reduction in an optical signal with the longer wavelength that results from termination of an optical signal with the shorter wavelength is automatically compensated. However, with this configuration, it takes some time until the optical power of an optical signal is adjusted to an optimum level. In addition, a response speed of a control circuit is restricted in order not to compete with the response speed of the doped rare-earth ion (here, that of erbium). Therefore, it is difficult to avoid occurrences of temporary shutdown of optical signal with the longer wavelength even the adjusting function is introduced.

SUMMARY OF THE INVENTION

The objective of this invention is to reduce output fluctuations of optical amplifiers used in a WDM optical communications system.

An optical amplifier of the present invention used in a WDM optical communications system, comprises: an optical fiber amplifying multi-wavelength light including a plurality of optical signals, a pump light source supplying pump light to the optical fiber, a dummy light source supplying dummy light to the optical fiber, an input monitor detecting a optical power of input light to the optical fiber, an output monitor detecting optical powers of the plurality of optical signals which have been amplified in the optical fiber, and a controller controlling the optical power of the pump light generated by the pump light source according to optical powers detected by the input monitor and the output monitor.

The optical amplifier collectively amplifies the multi-wavelength light including the plurality of optical signals. When this multi-wavelength light is amplified, some of the optical signals in the multi-wavelength light serve as pump light for some other optical signals. The dummy light is supplied to serve as pump light in the same way as some of the optical signals. Therefore, even some of the optical signals are stopped, the changes in the output optical powers of other optical signals are small, as they are pumped by the dummy light.

An optical amplifier of another feature of the present invention comprises: an optical fiber amplifying multi-wavelength light including a plurality of optical signals, a pump light source supplying pump light to the optical fiber, a dummy light source supplying dummy light to the optical fiber, and a controller controlling the dummy light source according to a number or an allocation of the optical signals in the multi-wavelength light.

In this optical amplifier, the optical power of the pump light should be large, if a number of optical signals in the multi-wavelength light is large. Therefore, if the number of optical signals in the multi-wavelength light is sufficiently large, when a particular optical signal is stopped, the changes in the output optical powers of other optical signals are small even without the dummy light.

Under situations in which the plurality of optical signals are allocated within a particular wavelength region, no optical signal serves as pump light for other optical signals. Therefore, when some optical signals are stopped, the changes in the output optical powers of the other optical signals are small even without the dummy light.

As a results, if the dummy light source is controlled according to the number or the allocation of the optical signals, generation of unnecessary dummy light is avoided.

BRIEF DESCRIPTION OF THE DRAWINGS

FIG. 10 through FIG. 14 are the variations of optical amplifiers according to the embodiment of the present invention.

FIG. 17 is an example of an information transmitted by supervising light.

DESCRIPTION OF THE PREFERRED EMBODIMENTS

Embodiments of the present invention are described below, with references to drawings.

Figure 5:
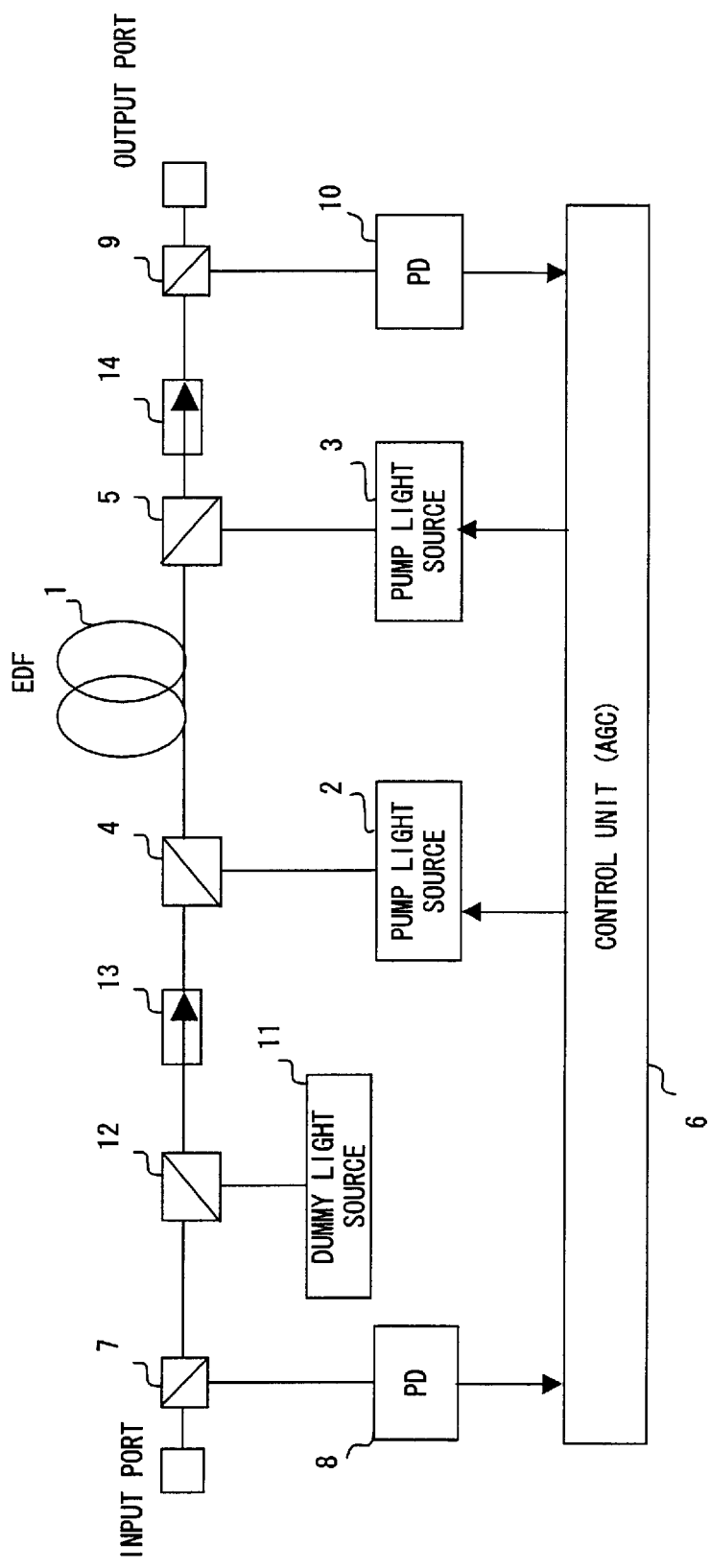
FIG. 5 shows the configuration of an optical amplifier according to an embodiment of the present invention.

FIG. 5 shows the configuration of an optical amplifier according to an embodiment of the present invention. This optical amplifier is used in a WDM communications system for mainly amplifying optical signals within the L-band. In addition, this optical amplifier is an erbium doped fiber optical amplifier using erbium doped fibers.

Multi-wavelength light via an input port is guided to the erbium doped fiber 1 (EDF 1) to be amplified, then outputted via an output port. The wavelength range of the multi-wavelength light is 1570 nm through 1607 nm, and corresponding wavelengths within this range are allocated to a plurality of transmission channels. The optical power of each of the optical signals contained in the multi-wavelength light is −20 dBm/ch at the input port.

Pump lights respectively generated by a pump light source 2 and a pump light source 3 are supplied to the EDF 1. The pump light source 2 generates pump light with a wavelength of 980 nm, which is multiplexed to the multi-wavelength light by the WDM coupler 4 and guided into the EDF 1. On the other hand, the pump light source 3 generates pump light with a wavelength of 1480 nm, which is guided into the EDF 1 by the WDM coupler 5. The output optical powers of the pump light source 2 and the pump light source 3 are controlled by a control unit 6.

The control unit 6 controls the output optical powers of the pump light source 2 and the pump light source 3 so that the gain of this optical amplifier is constant. In particular, the control unit 6 performs a feedback control for the pump light source 2 and pump light source 3 so that the gain calculated from the optical powers at the input port and output port of the optical amplifier is constant. Here, the multi-wavelength light is split by an optical splitter 7, the split light is guided to an optical receiving device 8, and it detects the input power of this optical amplifier. Similarly, the multi-wavelength light amplified by the EDF 1 is split by an optical splitter 9, the split light is guided to an optical receiving device 10, and it detects the output power of this optical amplifier. The optical splitter 7 and the optical splitter 9 are, for instance, 100:1 optical couplers. In addition, the optical receiving devices 8 and 10 are, for instance, photodiodes.

The optical amplifier according to this embodiment is further provided with a dummy light source 11 which supplies dummy light to the EDF 1. Dummy light generated by the dummy light source 11 is guided to the EDF 1 after being multiplexed to the multi-wavelength light by a WDM coupler 12. The wavelength of the dummy light is shorter than that of the L-band range. In particular, light with a wavelength of 1555 nm is used as the dummy light. The optical power of the dummy light is, for instance, set to −10 dBm. The optical amplifier according to this embodiment is further provided with an optical isolator 13 and an optical isolator 14 positioned respectively at the input side and output side of the EDF 1, for suppressing a laser emission due to Amplified Spontaneous Emission (ASE) or reflected waves.

Figure 6:
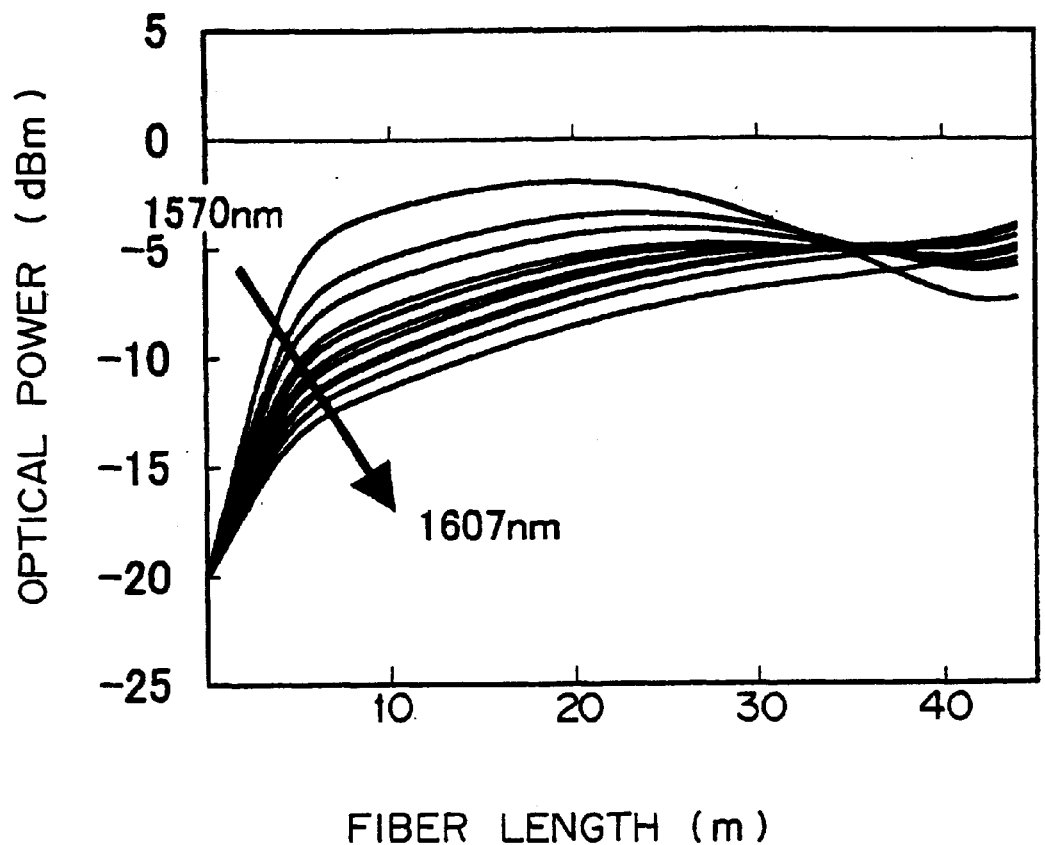
FIG. 6 shows the optical power profiles of L-band optical signals when amplified by an optical amplifier according to the embodiment.

FIG. 6 shows the optical power profiles obtained with an optical amplifier in FIG. 5, when amplifying optical signals in the L-band. The operating conditions associated with these profiles are as follows.

Length of EDF 1: 44 meters

Number of channels (number of multiplexed optical signals): 88

Intervals between channels: 0.4 nm

Wavelength range where channels are allocated: 1570–1607 nm

Input optical power of each channel: −20 dBm/ch

Figure 1:
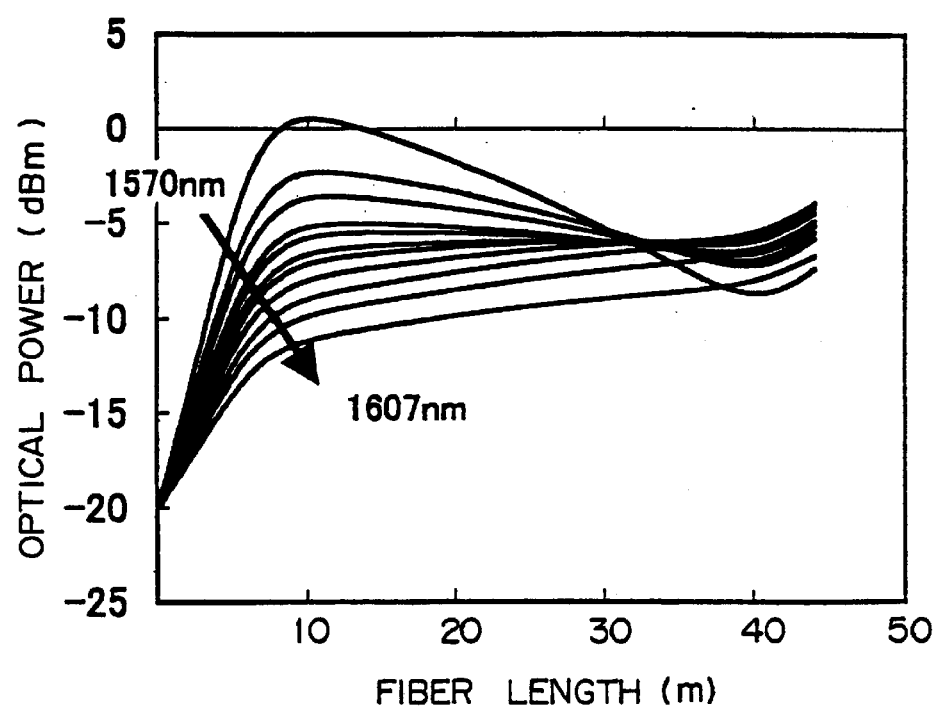
FIG. 1 shows the characteristics of a conventional erbium doped fiber optical amplifier.
Figure 2:
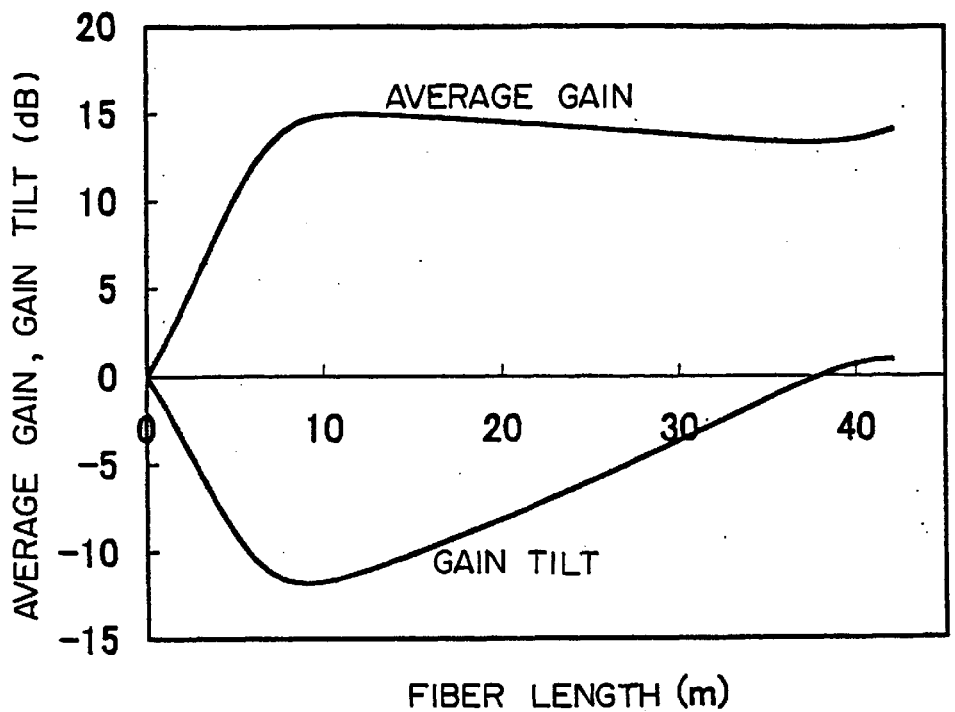
FIG. 2 shows the average gain and the gain deviation of an erbium doped fiber optical amplifier.
Figure 3:
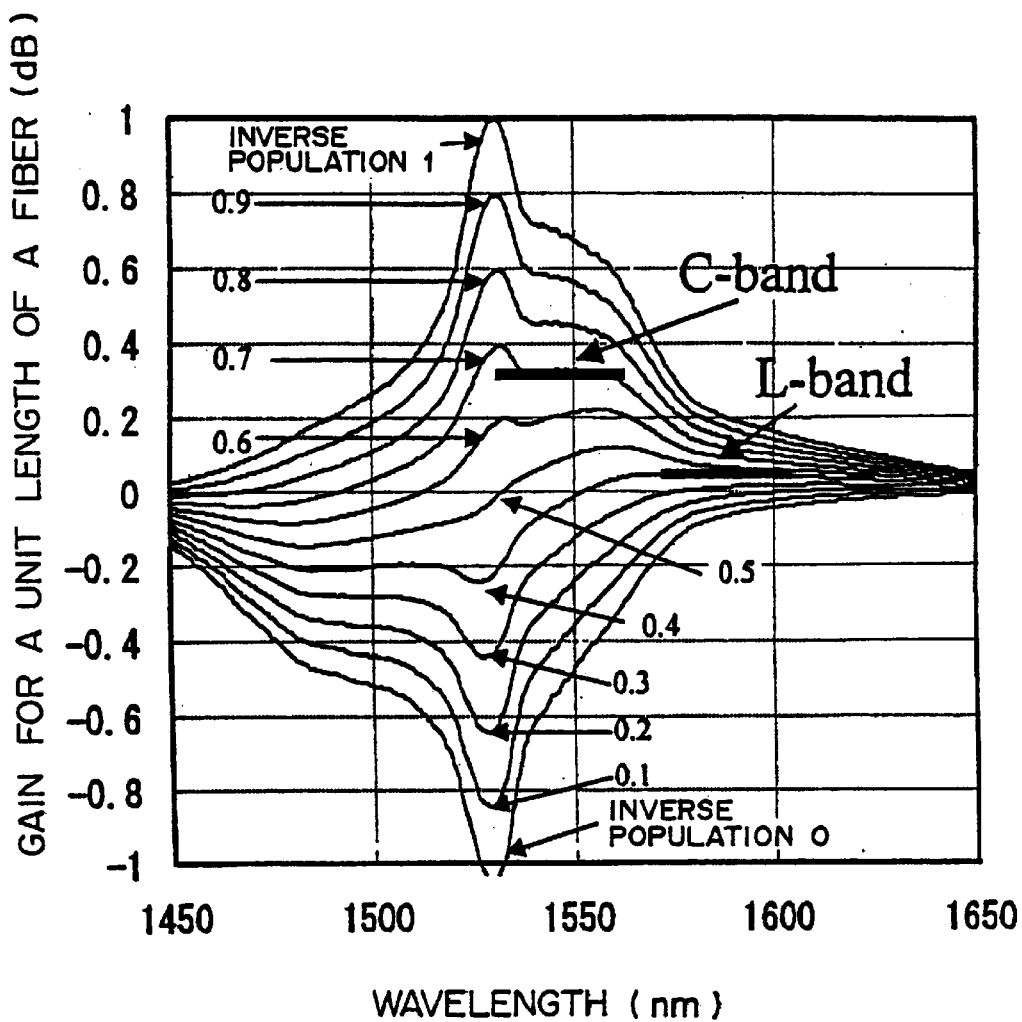
FIG. 3 shows the gain of an erbium doped fiber optical amplifier with respect to the inverted population.

Here, the profiles obtained by the optical amplifier according to this embodiment will be compared with the profiles shown in FIG. 1, which are obtained by a conventional optical amplifier according to prior art technologies. The profiles in FIG. 1 have been obtained with the same operating conditions as shown above for this embodiment of the present invention.

As is apparent from FIG. 1, when L-band is amplified by the conventional amplifier, the optical power of optical signal with a shorter wavelength changes greatly depending on the length of the EDF 1. In particular, the optical power of the optical signal with the shorter wavelength tends to decline, when the length of EDF 1 exceeds 10 meters. This profile, as mentioned earlier, is considered due to the fact that an optical signal with the shorter wavelength serves as pump light for optical signals with longer wavelengths.

In contrast, as shown in FIG. 6, when L-band is amplified by the optical amplifier according to this embodiment, the optical power of an optical signal with the shorter wavelength do not change that much with respect to changes in the length of an EDF 1. In particular, the optical power of an optical signal with a wavelength of 1570 nm, as the corresponding profile curve shows, remains almost constant for the EDF 1 changing in length from 10 to 30 meters, and it tends to decline slightly when the EDF 1 length exceeds 30 meters. This means that the energy transferred from optical signal with shorter wavelength to optical signals with longer wavelength is less. In other words, in the amplifier according to this embodiment, the proportion of shorter wavelength optical signals, that functions as pump light for the longer wavelength optical signals are small.

As described above, in the optical amplifier according to this embodiment, since the dummy light is supplied to the EDF 1, the proportion of optical signals with the shorter wavelengths, that functions as pump light for optical signals with the longer wavelengths is small. It is also correct to say that the optical powers of optical signals with the longer wavelengths do not change very much in association with the optical signals with the shorter wavelengths.

Figure 7:
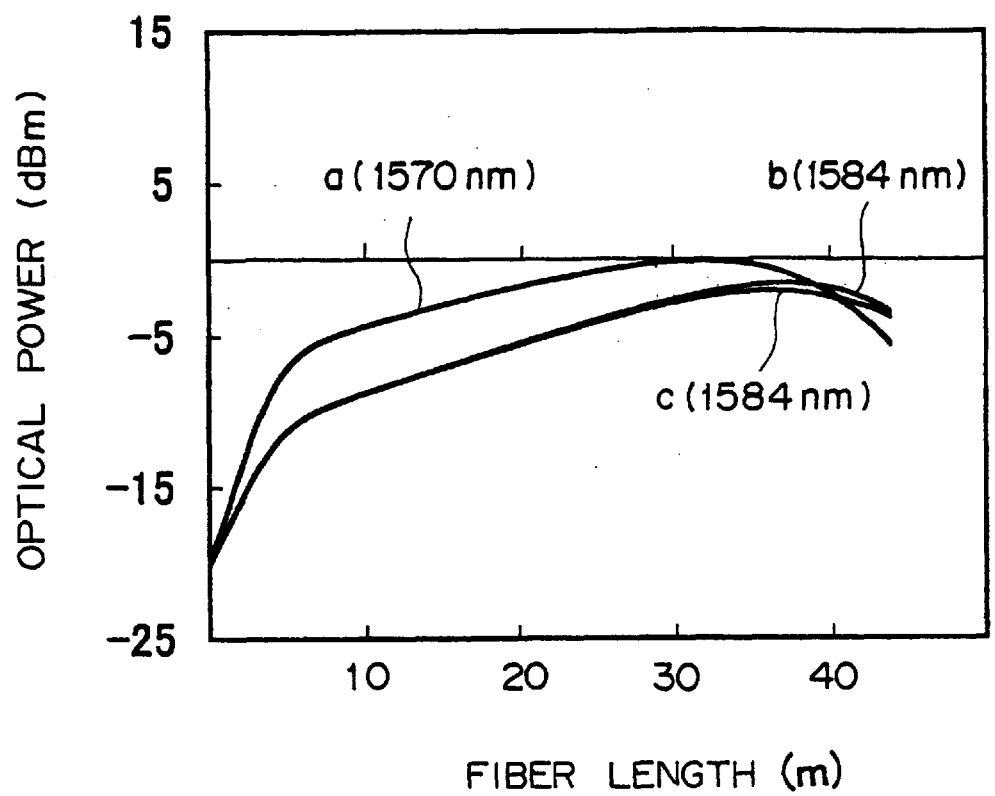
FIG. 7 and FIG. 8 show the effect of supplying dummy light.

FIG. 7 explains the effect of supplying the dummy light. In the same way as for the profiles shown in FIG. 4, only the optical signals with wavelengths of 1570 nm and 1584 nm are assumed to be transmitted in a WDM communications system. In FIG. 7, profile-a shows the optical power of the 1570 nm optical signal when both the 1570 nm and 1584 nm optical signals are transmitted. Profile-b is the optical power of the 1584 nm optical signal when both the 1570 nm and 1584 nm optical signals are transmitted. Profile-c is the optical power of the 1584 nm optical signal when only the 1584 nm optical signal is transmitted.

As shown in FIG. 7, the optical power of the 1584 nm optical signal shows little difference whether the 1570 nm optical signal is present or absent. In particular, the optical power of the 1584 nm optical signal which has been amplified by the EDF with a length of 44 meters is reduced only by 0.4 dB, when the 1570 nm optical signal is removed.

Figure 8:
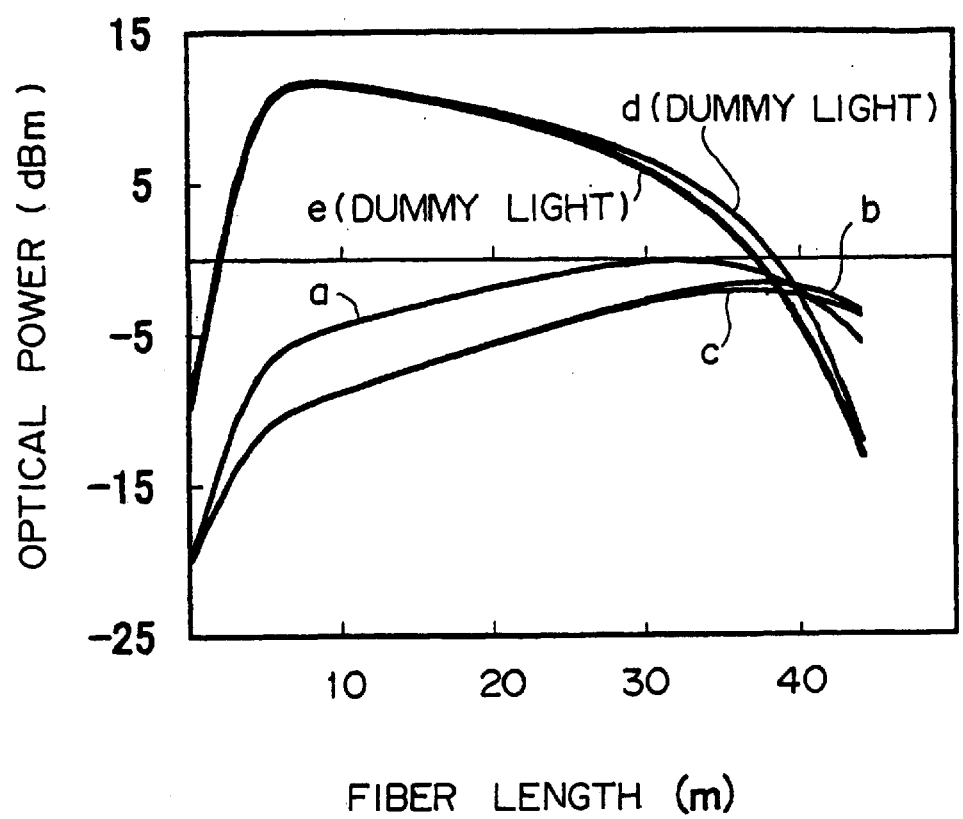

In FIG. 8, the profiles of the dummy light are overlaid on the same 1570 nm and 1584 nm optical signal profiles in FIG. 7. The optical power of the dummy light is reduced sharply when the EDF 1 length exceeds 30 meters. This indicates that the energy of the dummy light is transferred to the 1584 nm optical signal. The optical power of the dummy light when both the 1570 nm and 1584 nm optical signals are transmitted (profile-d) is shown to be higher than when only the 1584 nm optical signal is transmitted (profile-e). This is considered to be due to the fact that when both the 1570 nm and 1584 nm optical signals are transmitted, the 1584 nm optical signal absorbs energy from the 1570 nm optical signal as well as from the dummy light.

Discussed below is the method for determining the wavelength and optical power of the dummy light. The wavelength and optical power of the dummy light are basically fixed in the optical amplifier shown in FIG. 5. That is, the wavelength and the optical power of the dummy light are fixed when a communications system is installed.

The wavelength of the dummy light is determined as follows. Since the dummy light is supplied as pump light for optical signals with the longer wavelengths within the L-band, it must be light having the property capable of taking place of an optical signal with the shorter wavelength within the L-band. Thus, a wavelength of the dummy light should be same as that of an optical signal with the shorter wavelength within the L-band. For example, a wavelength which is located in the shorter wavelength region within the L-band range but is not used for any optical signals, can be used for the dummy light. In addition, since the dummy light must pump optical signals with the longer wavelengths within the L-band range, the wavelength of the dummy light must have a profile in which the optical power tends to be reduced as the EDF 1 length increases in FIG. 1. Considering these factors, it is desirable that the wavelength of the dummy light is 1585 nm or shorter.

Although the dummy light is supplied to play a function of optical signals with the shorter wavelengths within the L-band, the wavelength of the dummy light can be shorter than the shortest wavelength of the L-band. However, it is not desirable that a wavelength of the dummy light is too far from the L-band range, since the dummy light is employed to compensate for the influence of removing an optical signal with the shorter wavelength.

In determining the optical power of the dummy light, both the benefit of having the dummy light and the noise due to the dummy light need to be considered. The higher the optical power of the dummy light, the larger is the pumping performance so is the noise level that. Conversely, the smaller the optical power, the lower is the noise level so is the pumping performance. Therefore, the optical power of the dummy light must be determined considering these factors.

Figure 9A:
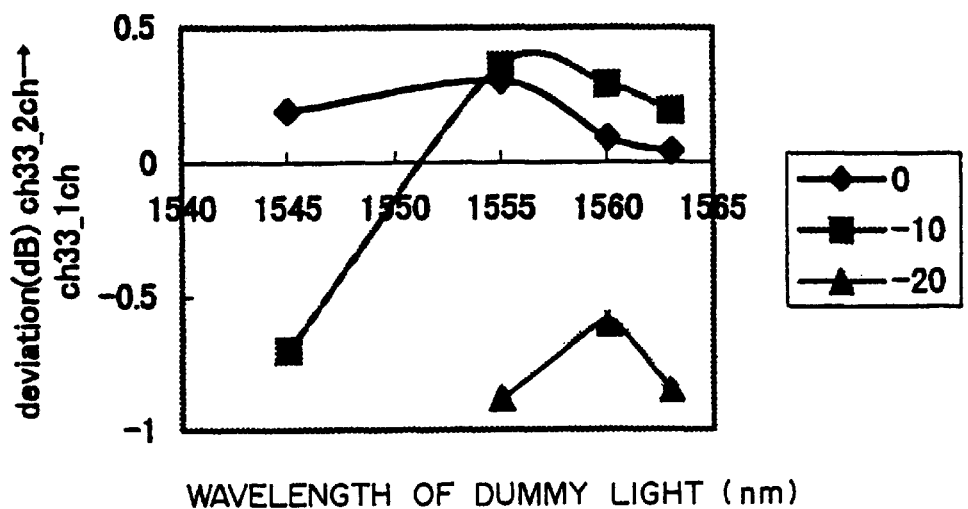
FIG. 9A shows the relation among the wavelength and the optical power of dummy light and the change in the output optical power of an optical signal.

FIG. 9A shows relations among the dummy light wavelength, the dummy light optical power and deviations in the output power of the optical amplifier. Here, the deviation in the output power is the changes in the optical power of the optical signal with wavelength of 1584 nm, when the optical signal with wavelength of 1570 nm is removed, as explained in association with FIG. 7. In the cases shown in FIG. 9A, the output optical power deviations are small, when the dummy light optical power is within the 0 to −10 dBm region and the dummy light wavelength is between 1550 and 1565 nm.

Figure 9B:
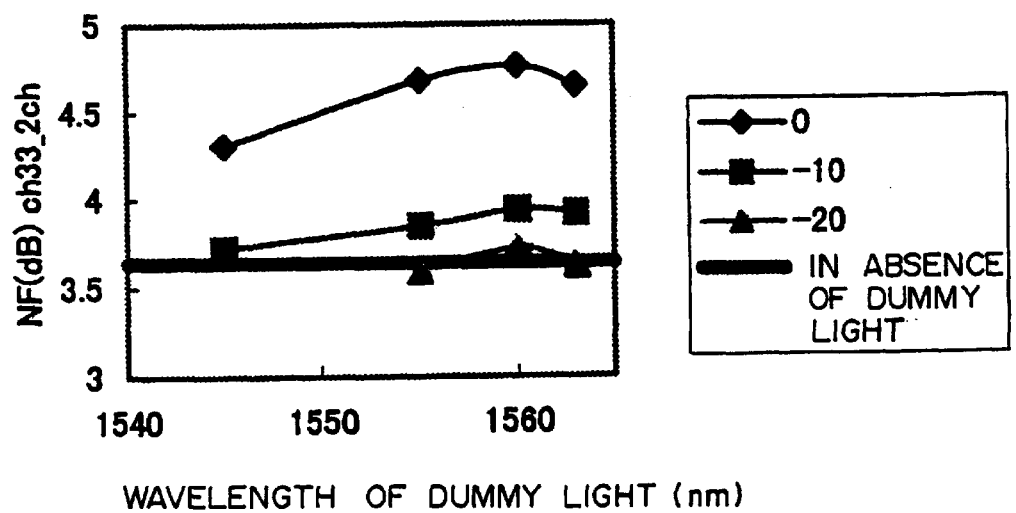
FIG. 9B shows the relation among the wavelength and the optical power of dummy light and the noise level in the output of an optical signal.

FIG. 9B shows relations among the dummy light wavelength, the dummy light optical power and the noise figure (NF: Noise Figure). In the cases shown in FIG. 9B, the noise figure remains low when the dummy light optical power is within the region of −10 dBm and −20 dBm. From the above, it can be said that the best result is obtained when the dummy light is −10 dBm in optical power and has a wavelength between 1550 and 1565 nm under the conditions employed in the cases shown in FIG. 9A and FIG. 9B.

As described above, with the optical amplifier shown in FIG. 5, the deviation in the optical power of optical signals with the longer wavelength within the L-band becomes small as a result of the dummy light being supplied to the EDF 1. Incidentally, in FIG. 5, it is shown that pump light is multiplexed with optical signals (multi-wavelength light) after the dummy light is multiplexed with the optical signals. However, the order of multiplexing the pump light and the dummy light is not limited to this order. In addition, the dummy light is supplied to the EDF 1 in the forwarding direction in FIG. 5, however, it can also be supplied to the EDF 1 in the backward direction. Some variations, that can be made to the optical amplifier shown in FIG. 5, are described below with references to FIGS. 10 through 14.

Figure 10:
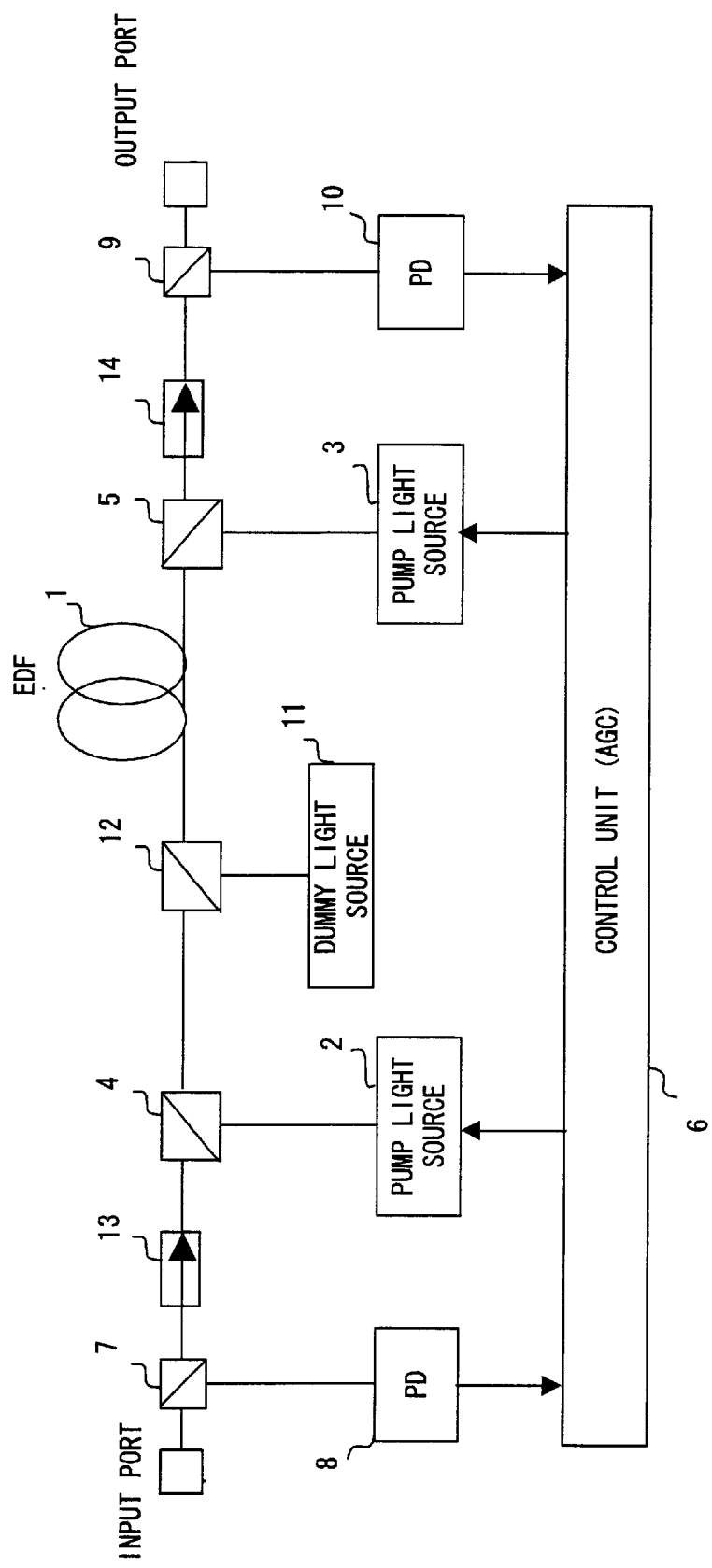

In an optical amplifier shown in FIG. 10, the pump light generated by the pump light source 2 is first multiplexed with optical signals, then the dummy light from the dummy light source 11 is multiplexed with the optical signals. In this configuration, the dummy light is supplied to the EDF 1 without going through the optical isolator 13 and the WDM coupler 4. Therefore, the optical isolator 13 and the WDM coupler 4 can be designed without any consideration to the wavelength of the dummy light. This configuration is particularly beneficial in a case where the wavelength of the dummy light is outside the L-band range.

Figure 11:
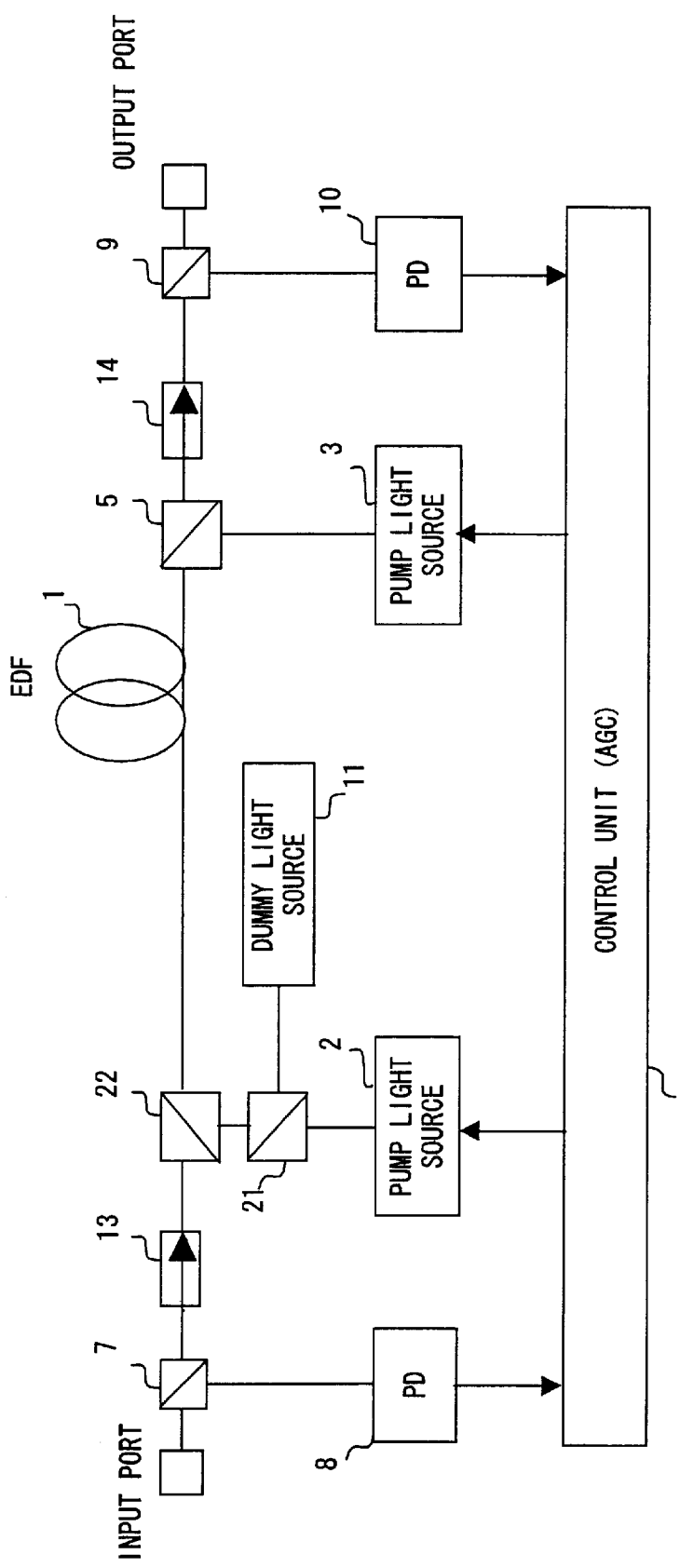

In an optical amplifier shown in FIG. 11, the pump light generated by the pump light source 2 and the dummy light generated by the dummy light source 11 are multiplexed by a WDM coupler 21, then the multiplexed light is supplied to the EDF 1 by a WDM coupler 22. In this configuration, the number of optical devices through which the optical signals have to pass is small. In particular, on a signal path from the input port to the EDF 1, three optical couplers (the splitter 7, the WDM coupler 12 and the WDM coupler 4) are disposed in the configurations shown in FIG. 5 and in FIG. 10, however, only two optical couplers (the splitter 7 and the WDM coupler 22) are disposed in the configuration shown in FIG. 11. Therefore, the noise figure can be lower in this optical amplifier.

Figure 13:
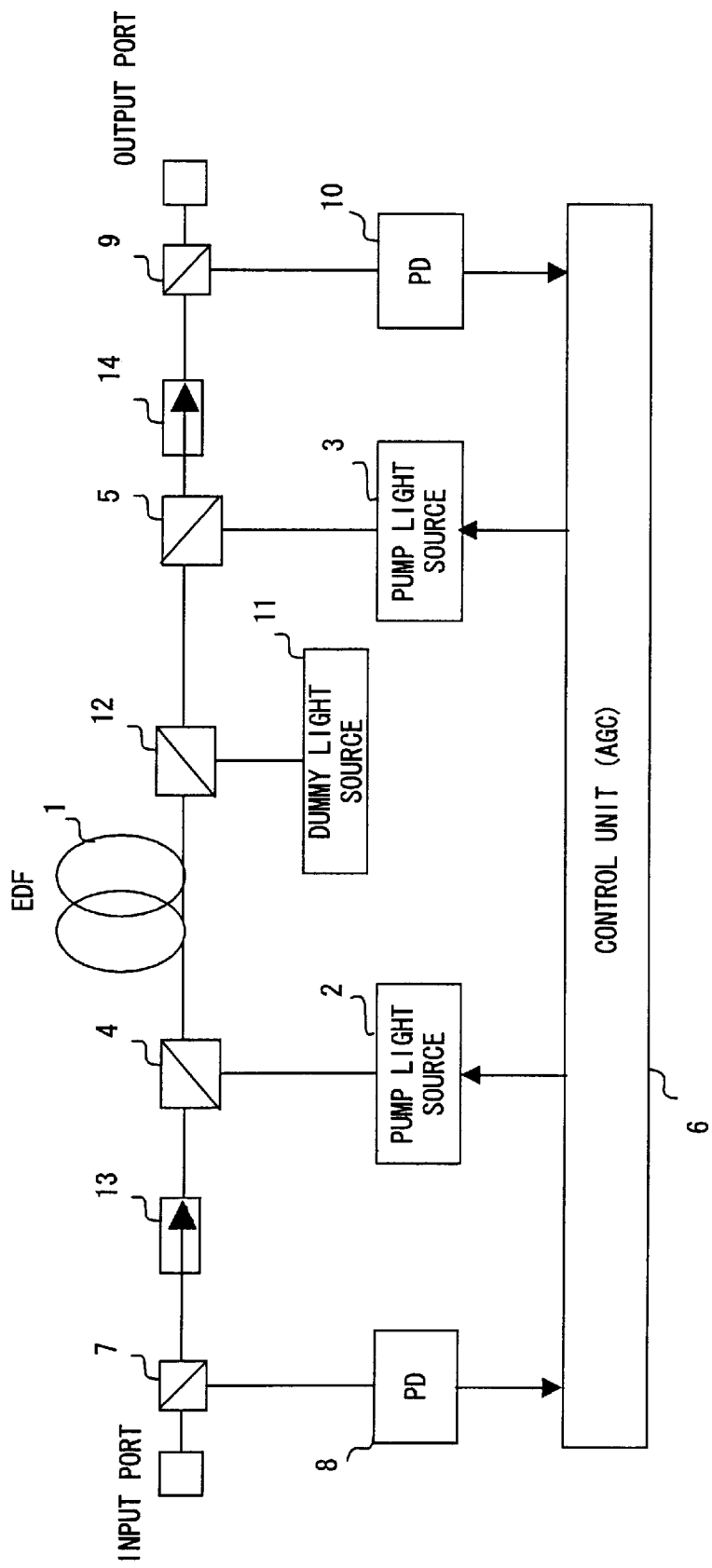
Figure 14:
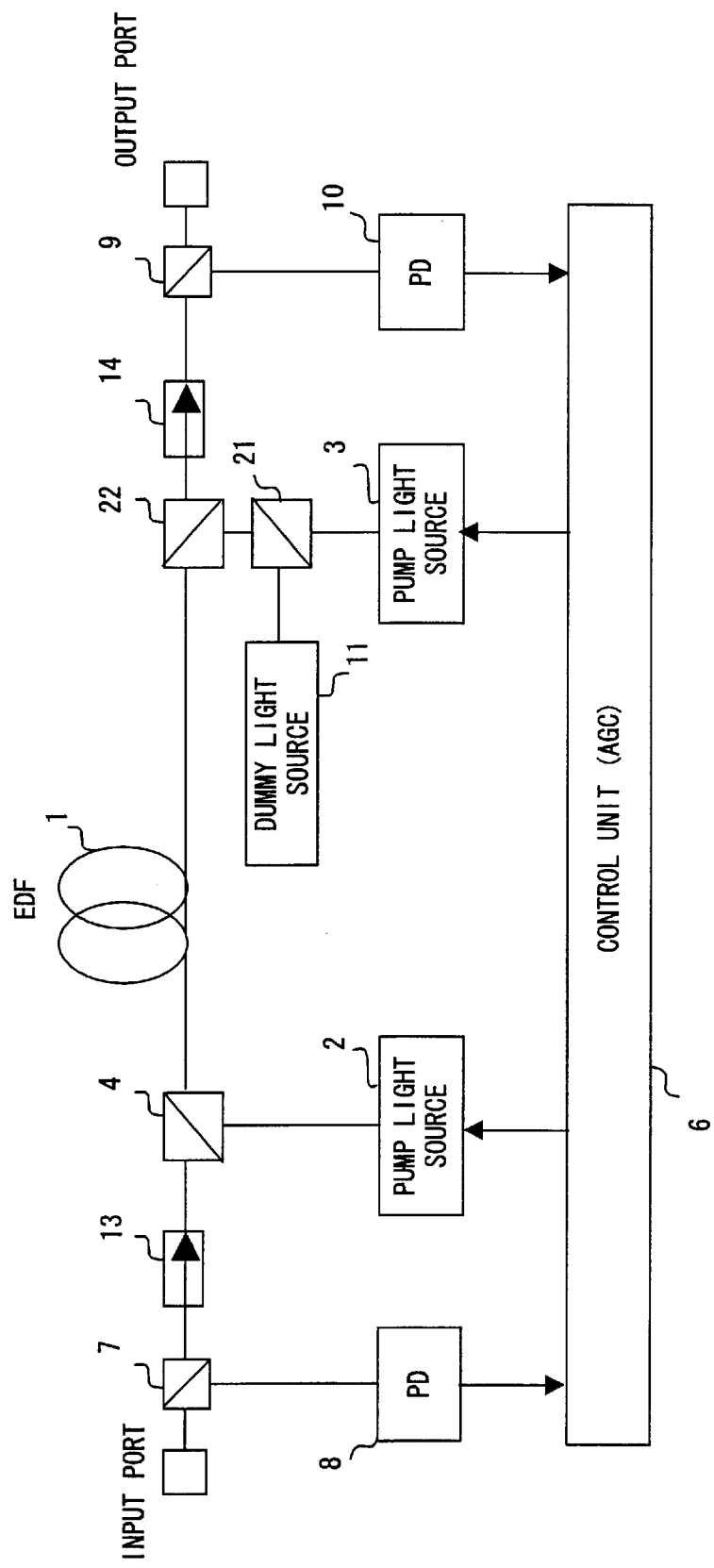

Optical amplifiers shown in FIG. 12, FIG. 13 and FIG. 14 correspond to optical amplifiers shown in FIG. 5, FIG. 10 and FIG. 11, respectively, and the dummy light is supplied to the EDF 1 in the backward direction. In the configurations shown in FIG. 12 and FIG. 13, the dummy light generated by the dummy light source 11 is guided to the EDF 1 by the WDM coupler 12 which is positioned at a backward part of the EDF 1. In the configuration shown in FIG. 14, the pump light generated by the pump light source 3 and the dummy light generated by the dummy light source 11 are multiplexed by the WDM coupler 21, then the multiplexed light is guided to the EDF 1 by the WDM coupler 22 which is positioned at a backward part of the EDF 1.

In optical amplifiers shown in FIG. 5, FIG. 10 and FIG. 11, the dummy light generated by the dummy light source 11 is transmitted in the same direction as optical signals. Thus, the dummy light is amplified by the EDF 1, and a portion of the amplified dummy light is guided to a photodiode (PD) 10 by the splitter 9. Therefore, in an optical amplifier of this type, a photodiode (PD) 8 detects the optical power of light including only optical signals, while the photodiode (PD) 10 detects the optical power of light including both optical signals and the dummy light. As a result, a gain of the EDF 1 may not detect accurately.

This problem can be overcome by installing an optical filter which removes the dummy light from the output of the EDF 1. In particular, this can be achieved by installing an optical filter removing only wavelength of the dummy light at a position between the splitter 9 and the photodiode (PD) 10. In optical amplifiers shown in FIG. 12, FIG. 13 and FIG. 14, it is not necessary to install such a filter, since the dummy light is transmitted in an opposite direction to optical signals and is removed by the optical isolator 13.

Figure 15:
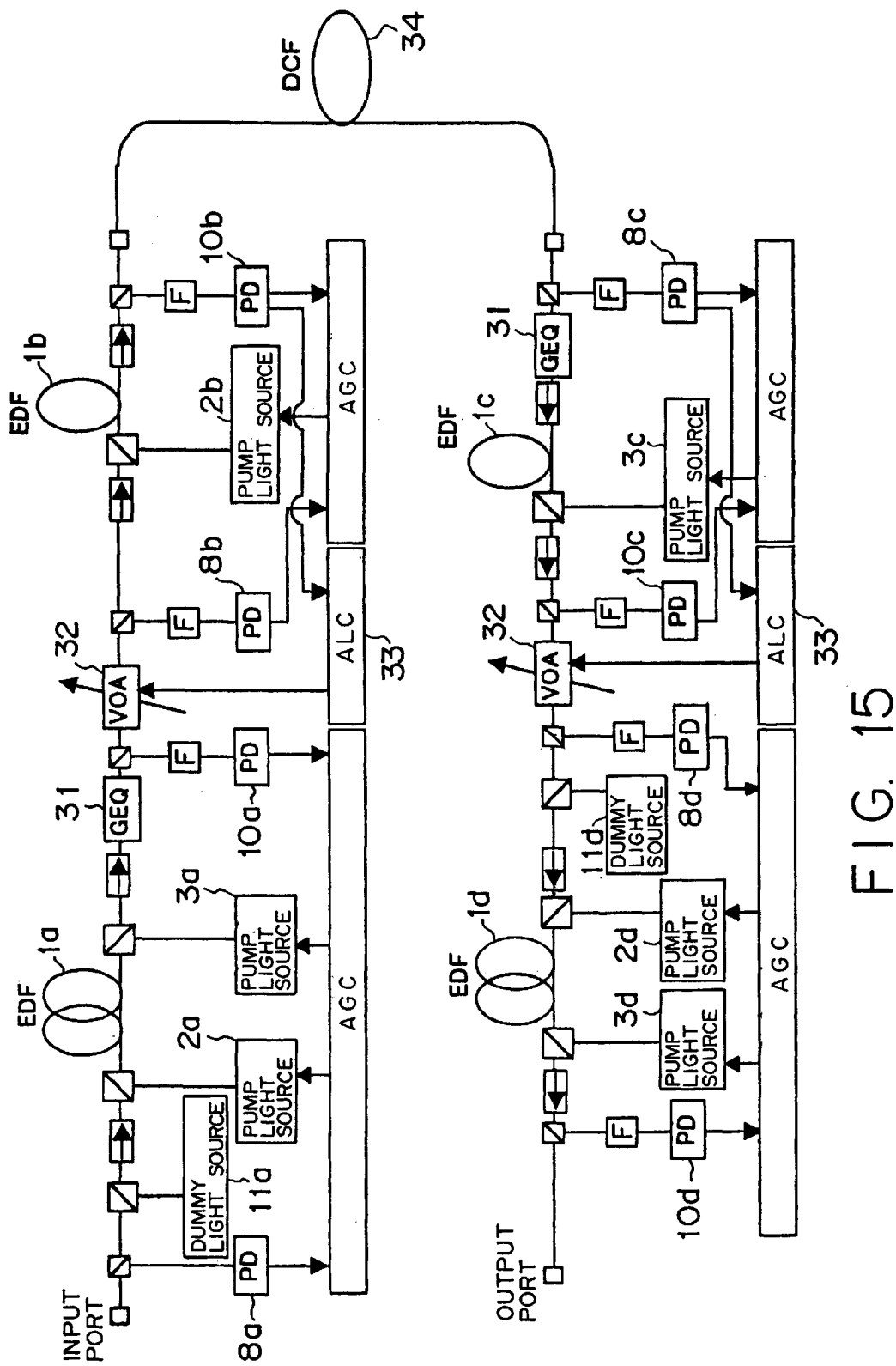
FIG. 15 shows an optical amplifier with multi-stage configuration.

FIG. 15 shows a multi-stage optical amplifier apparatus, in which the optical amplifier of the present invention is used. The optical amplifier apparatus includes four erbium-doped-fiber amplifiers connected in series in order to obtain large gain.

The first stage and the last stage optical amplifier has a configuration which is basically the same with what is shown in FIG. 5. In particular, in the first stage optical amplifier, pump light generated by a pump light source 2a and a pump light source 3a and dummy light generated by a dummy light source 11a are supplied to an EDF 1a. Similarly, in the last stage optical amplifier, pump light generated by a pump light source 2d and a pump light source 3d and dummy light generated by a dummy light source 11d are supplied to an EDF 1d. In contrast, in the second and the third stage optical amplifiers, no dummy light is supplied and the number of pump light sources provided is only one for each of the amplifiers.

This optical amplifier apparatus is provided with a gain equalizer 31 (GEQ). The gain equalizer is a unit for equalizing gains across a wavelength band range (L-band range in this embodiment), within which optical signals are allocated, and is manufactured based on the prior art technologies. This optical amplifier apparatus is further provided with a variable optical attenuator (VOA) 32, which operates under control of a control unit 33 to keep the average optical power of optical signals at a predetermined level. In particular, a variable optical attenuator 32 installed between the first stage and the second stage optical amplifiers is controlled so that it keeps the output power of the second stage optical amplifier at a constant level. A variable optical attenuator 32 installed between the third stage and the last stage amplifiers is controlled so that it keeps the input power of the third stage amplifier at a constant level. The optical amplifier apparatus is still further provided with a dispersion compensation fiber (DCF) 34 for compensating for the signal light dispersion, which is installed between the second stage and the third stage optical amplifiers. And yet further, this optical amplifier apparatus is provided with filters F for removing the dummy light with one each being installed at input side of each photodiode (10a, 8b, 10b, 8c, 10c, 8d, 10d).

It is generally desirable to design the first stage amplifier to have large gain in order to reduce the overall noise figure (NF) of a multi-stage optical amplifier apparatus. It is desirable to design the last stage amplifier to have large gain in order to obtain large output power from the multi-stage optical amplifier apparatus. Thus, the optical amplifier apparatus shown in FIG. 15 is provided with relatively long erbium doped fibers for the first stage (EDF 1a) and last stage (EDF 1d) amplifiers. As an erbium doped fiber becomes longer than a certain length, the problematic phenomenon, which has been described earlier in association with FIG. 4 can occur. Therefore, in the optical amplifier apparatus shown in FIG. 15, to avoid such a problem, dummy light is supplied at the first stage and the last stage amplifiers.

Figure 4:
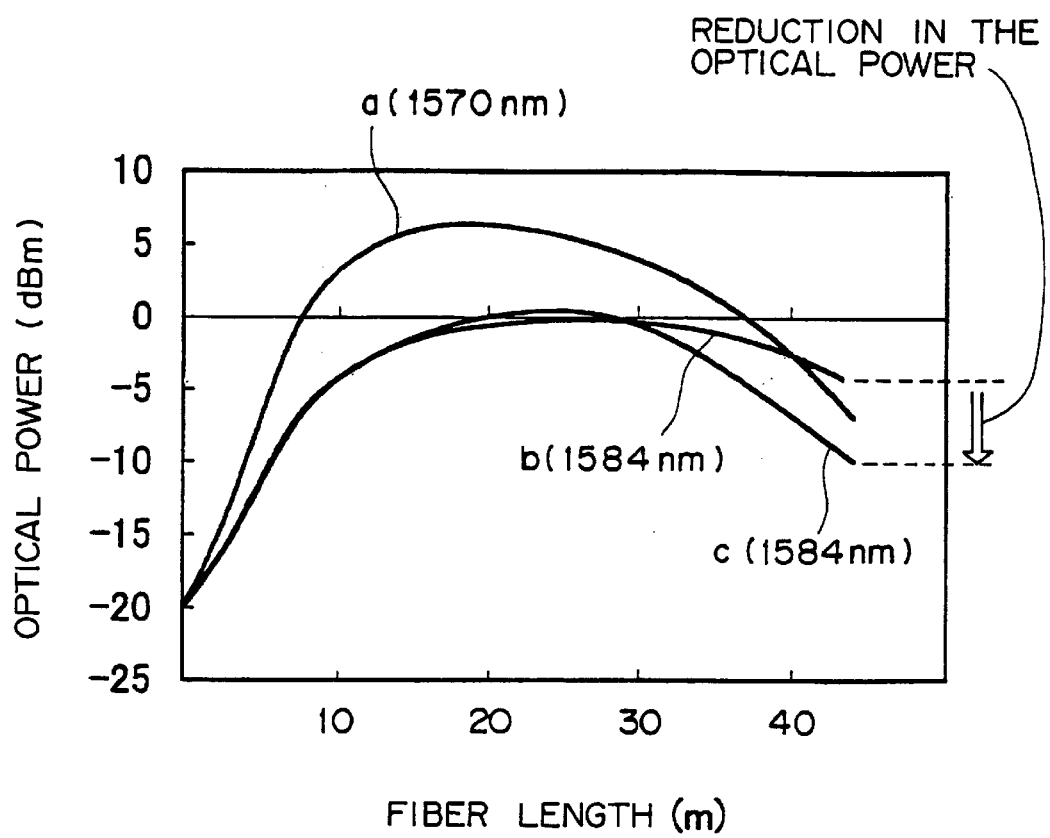
FIG. 4 shows an interaction between optical signals with different wavelengths.

In contrast, the erbium doped fiber lengths of the second stage (EDF 1b) and the third stage (EDF 1c) amplifiers are designed so that an occurrence of such a problem, as described in association with FIG. 4, is avoided. In particular, EDF 1b and EDF 1c are sized to a length shorter than 30 meters, and as a result, neither the second stage nor the third stage amplifier requires dummy light.

In all the configurations according to the embodiments described so far, the dummy light is assumed to be constant. The present invention, however, is not limited to such configurations, and can be configured so that dummy light properties are varied in accordance with some parameters.

Figure 16:
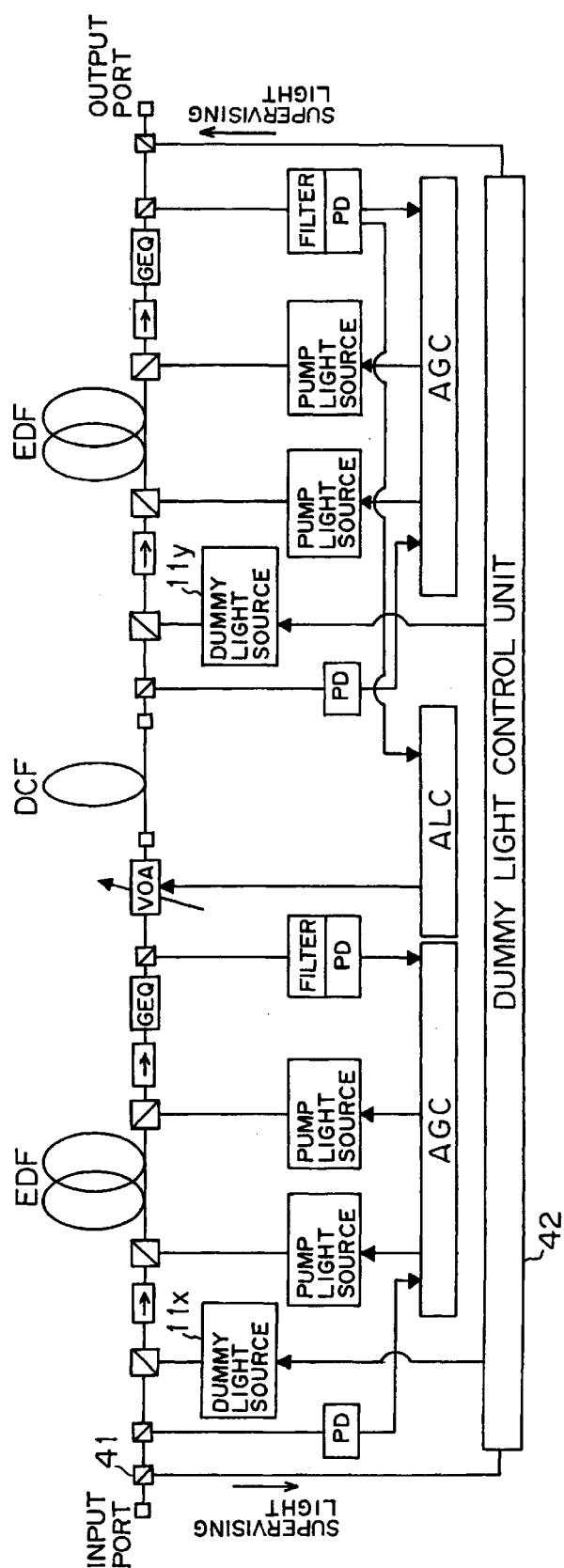
FIG. 16 shows an optical amplifier, in which dummy light is controlled according to certain conditions.

FIG. 16 shows an optical amplifier apparatus, in which dummy light are controlled based on predetermined conditions. It is assumed that supervising light is transmitted along with a set of optical signals in a communications system in which an optical amplifier apparatuses of the embodiment is installed. This optical amplifier apparatus adjusts the dummy light according to information transmitted by the supervising light. The optical amplifier apparatus is provided with two erbium doped fiber optical amplifiers, which are linked to each other in series. Each of the erbium doped fiber optical amplifiers is the same configuration as that shown in FIG. 5. The optical amplifier apparatus is further provided with a gain equalizer (GEQ), a variable optical attenuator (VOA), a dispersion compensation fiber (DCF), all of which are of the same configurations as described in association with FIG. 15.

The supervising light is generated by a transmitting station and is allocated with a wavelength that is separable from optical signals. A set of information conveyed by the supervising light includes information indicating the number of the optical signals and allocation of the optical signals in wavelength region, as shown in FIG. 17.

When multi-wavelength light including optical signals and supervising light is input to the optical amplifier apparatus shown in FIG. 16, the supervising light and the optical signals are separated by a demultiplexer 41. The supervising light is guided to a dummy light control unit 42. The dummy light control unit 42 analyzes a set of information contained in the supervising light and controls a dummy light source 11x and a dummy light source 11y based on the analysis result. In particular, dummy light is controlled according to the number of optical signals and allocation of the optical signals in wavelength region.

Generally, if number of wavelength used by the optical signals is large, the optical power of pump light, which is adjusted by AGC function, becomes large in order to pump the optical signals. In this case, optical signals with the longer wavelengths in the L-band are pumped mainly by the pump light, and the degree that optical signals with the shorter wavelengths within the L-band works as pump light for the optical signals with the longer wavelengths is low. That is to say, the optical power of optical signals with the longer wavelengths is hardly changed, if an optical signal with the shorter wavelength is stopped. In contrast, if number of wavelength used by the optical signals is small, the optical power of pump light, which is adjusted by AGC function, becomes small in order to pump the optical signals. In this case, the pump light can not pump the optical signals with the longer wavelength sufficiently, and the degree that optical signals with the shorter wavelengths within the L-band works as pump light for the optical signals with the longer wavelengths is high. That is to say, the optical power of optical signals with the longer wavelengths is greatly changed, if an optical signal with the shorter wavelength is stopped.

The dummy light control unit 42 detects "the number of wavelength used for optical signals" by analyzing the supervising light, and determines whether the number exceeds a predetermined number. If the detected number of wavelengths is smaller than the predetermined number, the dummy light control unit 42 issues instructions for generating the dummy light to the dummy light source 11x and 11y. If the detected number of wavelengths is larger than the predetermined number, the dummy light control unit 42 issues instructions for stopping or turning down the dummy light to the dummy light source 11x and 11y.

Generally, when optical signals of the L-band are amplified, optical signals with the shorter wavelengths work as pump light for optical signals with the longer wavelengths, as described in association with FIG. 1. Therefore, when only optical signals with the shorter wavelengths are transmitted or when only optical signals with the longer wavelengths are transmitted, the degree that one of optical signals works as pump light for another optical signals is low. That is, when only optical signals with the shorter wavelengths are transmitted or when only optical signals with the longer wavelengths are transmitted, each of the optical signals is hardly pumped by another optical signal but mainly by the pump light, hence the dummy light is not required.

As described above, under a condition in which no dummy light is supplied, the output power of optical signals with wavelength shorter than 1585 nm tends to decrease as the length of erbium doped fiber becomes longer than a certain length (in other words, optical signals which work as pump light for other optical signals). The dummy light control unit 42 detects "the allocation of wavelength used for optical signals" by analyzing the supervising light. Then, if, for example, only wavelengths longer than 1585 nm are used for the optical signals, the dummy light control unit 42 judges that no dummy light is required and issues instructions to the dummy light source 11x and 11y for stop outputting the dummy light or turning down the output power.

Figure 18:
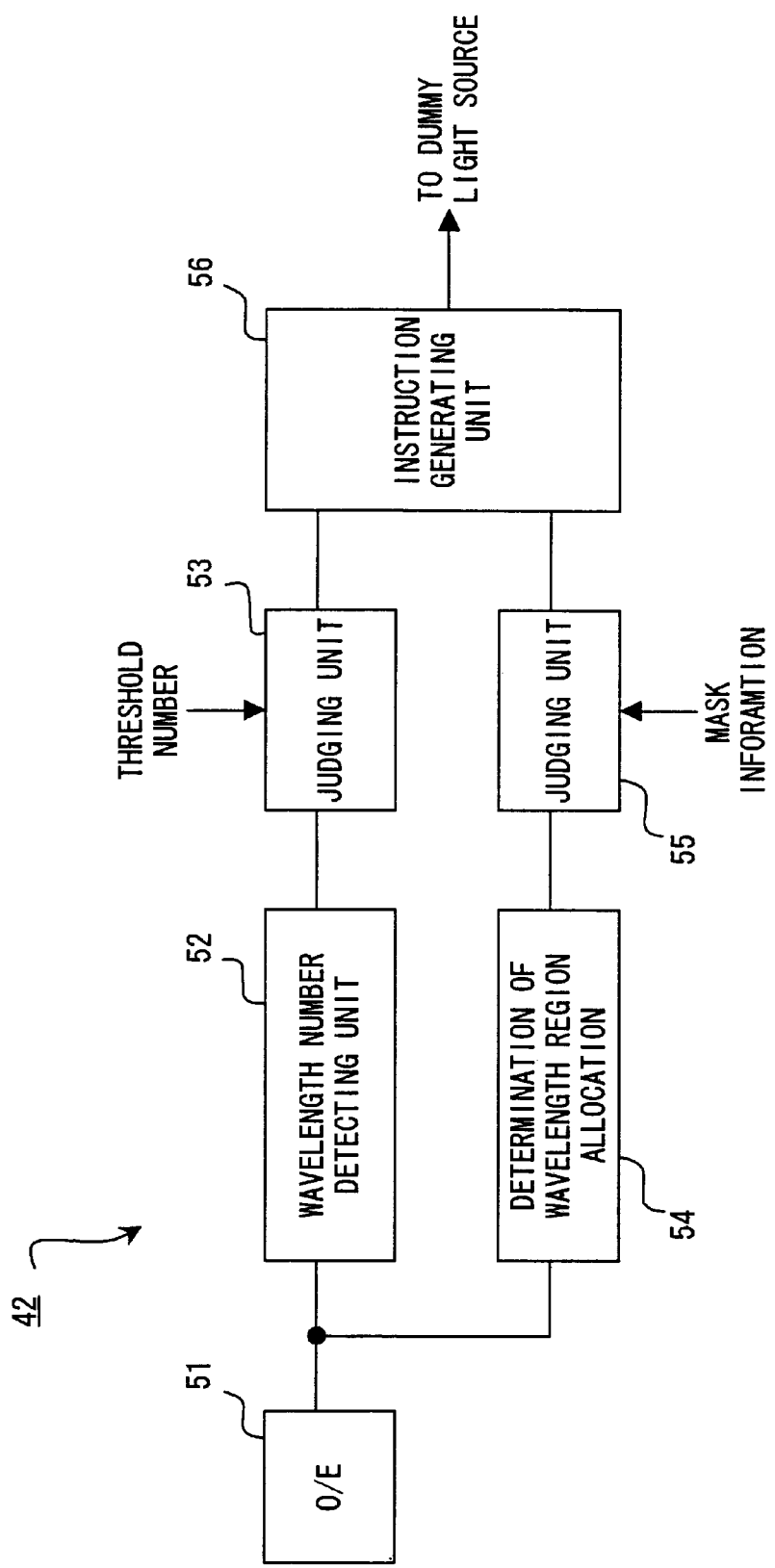
FIG. 18 is a block diagram of a control unit controlling the dummy light.

FIG. 18 is a block diagram of the dummy light control unit 42. The dummy light control unit 42, as described above, controls the dummy light sources based on the supervising light.

An opto-electronic device (O/E) 51 converts supervising light separated by the demultiplexer 41 into an electric signal. A set of information, such as that shown in FIG. 17, is obtained from this electric signal. A wavelength number detecting unit 52 analyzes a set of information shown in FIG. 17, and detects the number of wavelengths used for the optical signals. A judging unit 53 compares the number of wavelengths detected by the wavelength number detecting unit 52 and a pre-assigned threshold number, and sends the result to an instruction generating unit 56. Similarly, a wavelength allocation detecting unit 54 analyzes a set of information shown in FIG. 17, and detects the allocation of wavelengths used for optical signals. A judging unit 55 judges whether a wavelength which resides outside of a wavelength range specified by a pre-assigned mask information is used for an optical signal, and sends the result to the instruction generating unit 56. The mask information specifies, for example, a wavelength range of 1585–1610 nm. The instruction generating unit 56 issues instructions to each of the dummy light sources based on the results received from the judging units 53 and 55.

In an optical amplifier apparatus of this embodiment, the dummy light is controlled in reference to the number of wavelength used for optical signals and the allocation of wavelengths, however it may be controlled in reference to other parameters. For instance, the dummy light may be controlled in reference to the input power of optical signals or the gain of the optical amplifier. In this case, when the input power of optical signals is large, the dummy light is generated, and when the input power of optical signals is small, the dummy light is not generated. In addition, when the gain of the optical amplifier is large, the dummy light is generated, and when the gain of the optical amplifier is small, the dummy light is not generated.

In an optical amplifier of this embodiment, the wavelength of the dummy light is fixed, however it may be varied in reference to some parameters. For example, the wavelength of the dummy light may be adjusted in reference to the number of wavelengths used for optical signals and the allocation of wavelengths.

With the optical amplifier shown in FIG. 16, since the dummy light is generated only when required, the electric power consumption is reduced and the noise due to the dummy light is reduced.

In the above embodiments, the operation when an optical signal with shorter wavelength within the L-band is removed has been explained. In contrast, the benefits obtained when an optical signal with longer wavelength within the L-band is removed will be explained. In particular, if not for the dummy light, a part of energy of optical signals with shorter wavelengths is absorbed by optical signals with longer wavelength. Therefore, in this case, if the optical signal with longer wavelength is removed, energy of optical signals with shorter wavelengths is temporarily too high, which causes the optical powers of optical signals with shorter wavelengths becoming higher. However, if the dummy light is supplied, since optical signals with the longer wavelengths hardly absorb energy from optical signals with the shorter wavelengths, the optical power of optical signals with the shorter wavelengths increases only a little, when an optical signal with the longer wavelength is removed.

In this way, according to the optical amplifier of this embodiment, since the dummy light is supplied, optical power fluctuation of an optical signal is small, even when another optical signal is removed.

In the above embodiments of the present invention, erbium doped fiber optical amplifiers have been assumed to be optical amplifiers, but the present invention is not limited to such optical amplifiers. The present invention is applicable to other optical amplifiers such as, a Pr doped fiber optical amplifier, a Nd doped fiber optical amplifier and a Tb doped fiber optical amplifier. In addition, the present invention is not limited to the wavelength region in the embodiments. Further, the present invention not limited to rare-earth doped fiber optical amplifiers but includes other modes of optical amplifiers, such as Raman amplifiers.

According to the present invention, the fluctuations of the output power of an optical amplifier that is used in a WDM transmission system can be reduced. In particular, the fluctuations of output power of an optical amplifier, which is caused by changes in the number of wavelengths used for optical signals, is reduced.

What is claimed is:

1. An optical amplifier used in a WDM transmission system, comprising:

an optical fiber amplifying multi-wavelength light including a plurality of optical signals;

a pump light source supplying pump light to the optical fiber;

a dummy light source supplying dummy light to the optical fiber;

an input monitor detecting an input power;

an output monitor detecting an output power;

an allocation monitor detecting an allocation of optical signals in the multi-wavelength light; and a controller controlling an optical power of the pump light generated by said pump light source according to the input power detected by said input monitor and the output power detected by said output monitor, and controlling an optical power of the dummy light according to the allocation of optical signals in the multi-wavelength light.

2. The optical amplifier according to claim 1, wherein
a wavelength of the dummy light is shorter than a wavelength range in which the plurality of optical signals are allocated.

3. The optical amplifier according to claim 1, wherein
a wavelength of the dummy light is within a shorter wavelength range of a signal wavelength range in which the plurality of optical signals are allocated.

4. The optical amplifier according to claim 1, wherein
a wavelength of the dummy light is inside a signal wavelength range in which the plurality of optical signals are allocated, the wavelength of the dummy light being configures so that a respective optical signal of the plurality of optical signals having a longer wavelength in the signal wavelength range absorbs energy from the dummy light.

5. The optical amplifier according to claim 1, further comprises:
an optical filter which removes the dummy light outputted from the optical fiber.

6. The optical amplifier according to claim 1, further comprises:
at least one optical isolator installed at a front side or a rear side of the optical fiber.

7. The optical amplifier according to claim 1, further comprises:
a gain equalizer equalizing a gain of the optical fiber for the multi-wavelength light.

8. The optical amplifier according to claim 1, wherein
the optical fiber includes a plurality of rare-earth doped fibers, and a variable optical attenuator is installed between the rare-earth doped fibers.

9. The optical amplifier according to claim 1, wherein said optical amplifier is provided in an optical transmission line among a plurality of optical amplifiers, and the optical transmission line is configures so that dispersion compensators are installed between each of the optical amplifiers in the optical transmission line.

10. A method of amplifying multi-wavelength light including a plurality of optical signals, comprising:
supplying pump light to an optical fiber for amplifying the multi-wavelength light;
supplying dummy light corresponding to particular optical signal among the plurality of optical signals to the optical fiber; and
controlling the dummy light according to an allocation of the optical signals.

11. A method of amplifying multi-wavelength light including a plurality of optical signals, comprising:
supplying pump light to an optical fiber for amplifying the multi-wavelength light;
supplying dummy light corresponding to a respective optical signal among the plurality of optical signals to the optical fiber; and
controlling the dummy light according to a number of optical signals included in the multi-wavelength light, wherein
the dummy light is stopped or turned down when the number of optical signals is larger than a predetermined number of the optical signals.

12. An optical amplifier used in a WOM transmission system, comprising:
an optical fiber amplifying multi-wavelength light including a plurality of optical signals;
a pump light source supplying pump light to the optical fiber;
a dummy light source supplying dummy light to the optical fiber; and
a controller controlling said dummy light source according to an allocation of optical signals in the multi-wavelength light.

13. An optical amplifier used in a WDM transmission system, comprising:
an optical fiber amplifying multi-wavelength light including a plurality of optical signals;
a pump light source supplying pump light to the optical fiber;
a dummy light source supplying dummy light to the optical fiber; and
a controller controlling said dummy light source according to a number of the optical signals in the multi-wavelength light, wherein
said controller stops or turns down the dummy light when the number of optical signals is larger than a predetermined number of the optical signals.

14. An optical amplifier used in a WDM transmission system, comprising:
an optical fiber amplifying multi-wavelength light including a plurality of optical signals;
a pump light source supplying pump light to the optical fiber;
a dummy light source supplying dummy light to the optical fiber; and
a controller controlling said dummy light source according to an allocation of optical signals in the multi-wavelength light, wherein if the allocation of the optical signals is such that all of the optical signals combined have a wavelength greater than a predetermined wavelength, the controller controls the down the dummy light source to stop the dummy light.

* * * * *

UNITED STATES PATENT AND TRADEMARK OFFICE
CERTIFICATE OF CORRECTION

PATENT NO. : 6,738,184 B2
DATED : May 18, 2004
INVENTOR(S) : Etsuko Hayashi et al.

It is certified that error appears in the above-identified patent and that said Letters Patent is hereby corrected as shown below:

Column 13,
Line 47, please add -- , wherein if the allocation of the optical signals is such that all of the optical signals have a wavelength greater than a predetermined wavelength, the controller controls the dummy light source to stop the dummy light -- before ".".
Line 48, replace "A" with -- The --, delete "of amplifying multi-wavelength light".

Column 14,
Delete lines 1-5 in their entirety.
Line 6, add -- according to claim 13, -- before "wherein".
Line 10, please add -- , wherein if the allocation of the optical signals is such that all of the optical signals have a wavelength greater than a predetermined wavelength, the controller controls the dummy light source to stop the dummy light -- before".".
Line 21, replace "A" with -- The --, delete "used in a WOM transmission".
Delete lines 22-30 in their entirety.
Line 31, delete "wavelength light".
Line 31, add -- according to claim 15 -- before ",".
Line 48, please delete "down the".

Signed and Sealed this

Twenty-eighth Day of September, 2004

JON W. DUDAS
*Director of the United States Patent and Trademark Office*